US008278831B2

(12) United States Patent
Hoogzaad et al.

(10) Patent No.: US 8,278,831 B2
(45) Date of Patent: Oct. 2, 2012

(54) LED DRIVER CIRCUIT AND METHOD, AND SYSTEM AND METHOD FOR ESTIMATING THE JUNCTION TEMPERATURE OF A LIGHT EMITTING DIODE

(75) Inventors: Gian Hoogzaad, Mook (NL); Hans Schmitz, Herkenbosch (NL); Wilhelmus H. M. Langeslag, Wijchen (NL); Radu Surdeanu, Roosbeek (BE)

(73) Assignee: NXP B.V., Eindhoven (NL)

( * ) Notice: Subject to any disclaimer, the term of this patent is extended or adjusted under 35 U.S.C. 154(b) by 113 days.

(21) Appl. No.: 12/864,740

(22) PCT Filed: Jan. 27, 2009

(86) PCT No.: PCT/IB2009/050326
§ 371 (c)(1),
(2), (4) Date: Jul. 27, 2010

(87) PCT Pub. No.: WO2009/095854
PCT Pub. Date: Aug. 6, 2009

(65) Prior Publication Data
US 2010/0315019 A1 Dec. 16, 2010

(30) Foreign Application Priority Data

Jan. 28, 2008 (EP) .................................. 08101015
Oct. 6, 2008 (EP) .................................. 08105498

(51) Int. Cl.
*H05B 37/02* (2006.01)
*H05B 39/04* (2006.01)
*H05B 41/36* (2006.01)
(52) U.S. Cl. .................... 315/209 R; 315/225; 315/291; 315/299; 315/307

(58) Field of Classification Search .................. None
See application file for complete search history.

(56) References Cited

U.S. PATENT DOCUMENTS 6,329,764 B1 12/2001 van de Ven
(Continued)

FOREIGN PATENT DOCUMENTS

DE 102006032071 A1 7/2006
(Continued)

OTHER PUBLICATIONS

Lumileds; Application Brief; "Electrical Drive Information for Luxeon Products".

(Continued)

*Primary Examiner* — Anh Tran

(57) ABSTRACT

A driver circuit (10) for a light emitting diode comprises a first driver circuit (32, 32', 32') for generating a first current output for driving the light emitting diode, wherein the first driver circuit has a control switch for interrupting the supply of the first current output. A second driver circuit (50) is for generating a second current output for driving the light emitting diode, and the second driver circuit also has a control switch for interrupting the supply of the second current output. The overall output of the driver circuit comprises a pulse width modulated output current which alternates between a high current ($I_{high}$) generated by the first driver circuit and a low current ($I_{low}$) generated by the second driver circuit. By providing separate driver circuits for two different current requirements, the circuits can be optimised for each function. For example the high current value can comprise an LED operation current, and the low current value can comprise a non-zero measurement current.

18 Claims, 4 Drawing Sheets

U.S. PATENT DOCUMENTS

| | | | |
|---|---|---|---|
| 2001/0043093 A1* | 11/2001 | Sakura et al. | 327/108 |
| 2005/0082553 A1 | 4/2005 | Yamamoto et al. | |
| 2005/0168168 A1* | 8/2005 | Elliott | 315/247 |
| 2010/0019681 A1* | 1/2010 | Deixler et al. | 315/185 R |

FOREIGN PATENT DOCUMENTS

| | | |
|---|---|---|
| JP | 59 019382 A | 1/1984 |
| WO | 00/18290 | 4/2000 |
| WO | 2006/043232 A1 | 4/2006 |

OTHER PUBLICATIONS

International Search Report and Written Opinion for Application PCT/IB2009/050326 (Jan. 27, 2009).

Siegal, Bernie; "Practical Considerations in High Power LED Junction Temperature Measurements", Electronics Manufacturing and Technology, 31st International Conference, IEEE Piscataway, NJ, Nov. 8, 2007; pp. 62-66.

* cited by examiner

LED DRIVER CIRCUIT AND METHOD, AND SYSTEM AND METHOD FOR ESTIMATING THE JUNCTION TEMPERATURE OF A LIGHT EMITTING DIODE

This invention relates to lighting devices using light emitting diodes (LEDs), and particularly to the control of such devices based on temperature.

Lighting using solid-state devices such as LEDs is gaining momentum. The use of LEDs for lighting has several advantages over the use of conventional light sources, including a better light output/dimension ratio and improved power efficiency. The light output intensity of a LED can be controlled by either:

(a) regulating the amplitude of the current through the LED, or (b) regulating the frequency and duty cycle of the current pulse through the LED.

A combination of both techniques can also be used.

During operation, the LED temperature increases and this influences the amount of light output of the LED as well as the dominant wavelength of the output light. A knowledge of the temperature at the junction of a LED is crucial for controlling the LED to have maximum performance.

It has been recognised that temperature measurement is desirable to provide a feedback value for use in controlling the LED driver conditions. Typically, the LED junction temperature is measured using an external temperature sensor located close to the LED. This method has one major disadvantage that the measured temperature is not the real temperature at the LED junction (which is usually higher). To compensate for this error, sophisticated thermal diffusion models can be used to predict (or extrapolate) the LED junction temperature based on the measured temperature from the sensor. The accuracy of the junction temperature prediction is heavily dependent on the quality of the model, and the accuracy of the parameters that are used in the model, such as thermal resistance and thermal capacitance of the packaging materials surrounding the LED etc.

Another known method to measure LED junction temperature is to monitor the forward voltage of the LED while driving a constant current through it. This method uses the LED itself as a temperature sensor, and therefore saves cost and also should enable improved accuracy. However, the current through the LED can introduce a so-called self-heating effect which in turn makes the temperature reading less accurate. A solution to avoid the self-heating effect of the LED is to use a very small current for LED junction temperature measurement.

However, using a small current to measure the forward-voltage of the LED means it can only be done when the LED is turned off. The time delay between the moment the LED is turned off to the moment measurement takes place will influence the accuracy of the temperature reading, due to the extremely fast junction cool-off phenomenon. Another problem with the accuracy of temperature measurement using this method is the variation of the small current used for measurement can induce a variation in the forward voltage of the LED. Depending on the amplitude of the measurement current and its variation, the change in forward voltage due to temperature may not be visible.

US 2005/0082553 describes a method for controlling a LED by detecting the forward voltage of the LED while it is illuminating at operational current and to map this to the ambient temperature of the LED. The value of temperature is then translated to an appropriate current needed to drive the LED by means of a table look up method. The current flow through the LED is subsequently adjusted accordingly with the new value.

In this control method, the table look up approach does not give good control over LED performance, because the values are discrete and therefore the performance of the LED will be erratic. To avoid erratic LED performance, many points are be required in the table requiring significant memory size and slow speed of the control.

The applicant has proposed (but not yet published) a method of estimating the junction temperature of a light emitting diode, in which a forward bias current is driven through the diode, the current comprising a square wave which toggles between high and low current values. The high current value is an LED operation current, and the low current is a non-zero measurement current. The forward bias voltage drop is sampled, in order to determine the forward bias voltage drop at the measurement current. The temperature is then derived from the determined forward bias voltage drop.

This method uses measurement current pulses for driving the LED with a low non-zero current. This allows the LED temperature measurement to take place while the LED is in operation. The low measurement current pulses are alternated (in a square wave pulse sequence) with high current LED drive pulses. The low measurement current pulses preferably have a current less than 1 mA, more preferably in the range 0.01 mA to 0.1 mA. The actual current level should fulfil several requirements: not too small to be too slow for settling, not too small to be impacted by leakage currents, not too large to suffer from self-heating or LED series resistance, not too large to interfere with the LED dimming range.

The low current value is orders of magnitude smaller than the normal operating current, which typically may be in the range 10 mA to 350 mA. Providing this small measurement current presents a design challenge for the LED driver, which also needs to be able to supply the desired operating current.

According to the invention, there is provided a driver circuit for a light emitting diode, comprising:

a first driver circuit for generating a first current output for driving the light emitting diode, wherein the first driver circuit has a control switch for interrupting the supply of the first current output;

a second driver circuit for generating a second current output for driving the light emitting diode, wherein the second driver circuit has a control switch for interrupting the supply of the second current output, wherein the output of the driver circuit comprises the combination of the first and second driver circuit outputs, in the form of a pulse width modulated output current which alternates between a high current including the first current output generated by the first driver circuit and a low current comprising the second current output generated by the second driver circuit.

The use of two separate driver circuits enables a time delay between the different output currents to minimized since the low current value is already stable. The accuracy of the low measurement current can also be optimized separately.

By providing separate driver circuits for two different current requirements, the circuits can be optimised for each function. For example, the high current value can comprise an LED operation current, and the low current value can comprise a non-zero measurement current. Thus, the driver enables currents for two different operation modes to be generated. The high current can comprise simply the output of the first driver circuit (with the second driver circuit off) or the combination of the first and second driver circuit outputs (both driver circuits turned on).

The low current value can be less than or equal to 1 mA, or even less than or equal to 0.1 mA. The high current value can be greater than or equal to 10 mA, or even greater than or equal to 100 mA.

The first driver circuit can comprise a switch-mode power converter, such as a buck converter or a boost converter, a flyback converter, a buck-boost converter, a Sepic ("single-ended primary inductance converter") or a Cuk capacitive converter. Indeed, any conventional drive circuit for driving an LED can be used. The second driver circuit preferably comprises a current mirror transistor circuit. This circuit can be optimised for the specific (small) current to be generated.

The invention also provides a system for estimating the junction temperature of a light emitting diode, comprising:

a circuit of the invention for driving a forward bias current through the diode, means for sampling the forward bias voltage drop, and determining the forward bias voltage drop at the low current value, which comprises a measurement current; and means for deriving the temperature from the determined forward bias voltage drop.

The means for sampling can comprise means for analysing the samples to find a forward bias voltage drop which corresponds to a peak in the number of occurrences of that voltage drop.

The invention also provides a LED control system comprising:

a system of the invention for estimating the junction temperature; and an LED drive circuit for driving the LED in dependence on the estimated junction temperature.

The invention also provides a method of estimating the junction temperature of a light emitting diode, comprising:

generating a forward bias current using a circuit of the invention, and driving the output current through the diode;

sampling the forward bias voltage drop, and determining the forward bias voltage drop at the low current value, which comprises a measurement current; and deriving the temperature from the determined forward bias voltage drop.

Examples of the invention will now be described with reference to the accompanying drawings, in which.

The invention provides a driver circuit for controlling an LED.

The driver circuit of the invention is particularly designed for implementing a method to measure the junction temperature of a LED, which has been proposed (but not yet published) by the applicant. This junction temperature measurement method will first be described.

FIGS. 1A to 1D are graphs which schematically represent the method.

Figure 1:
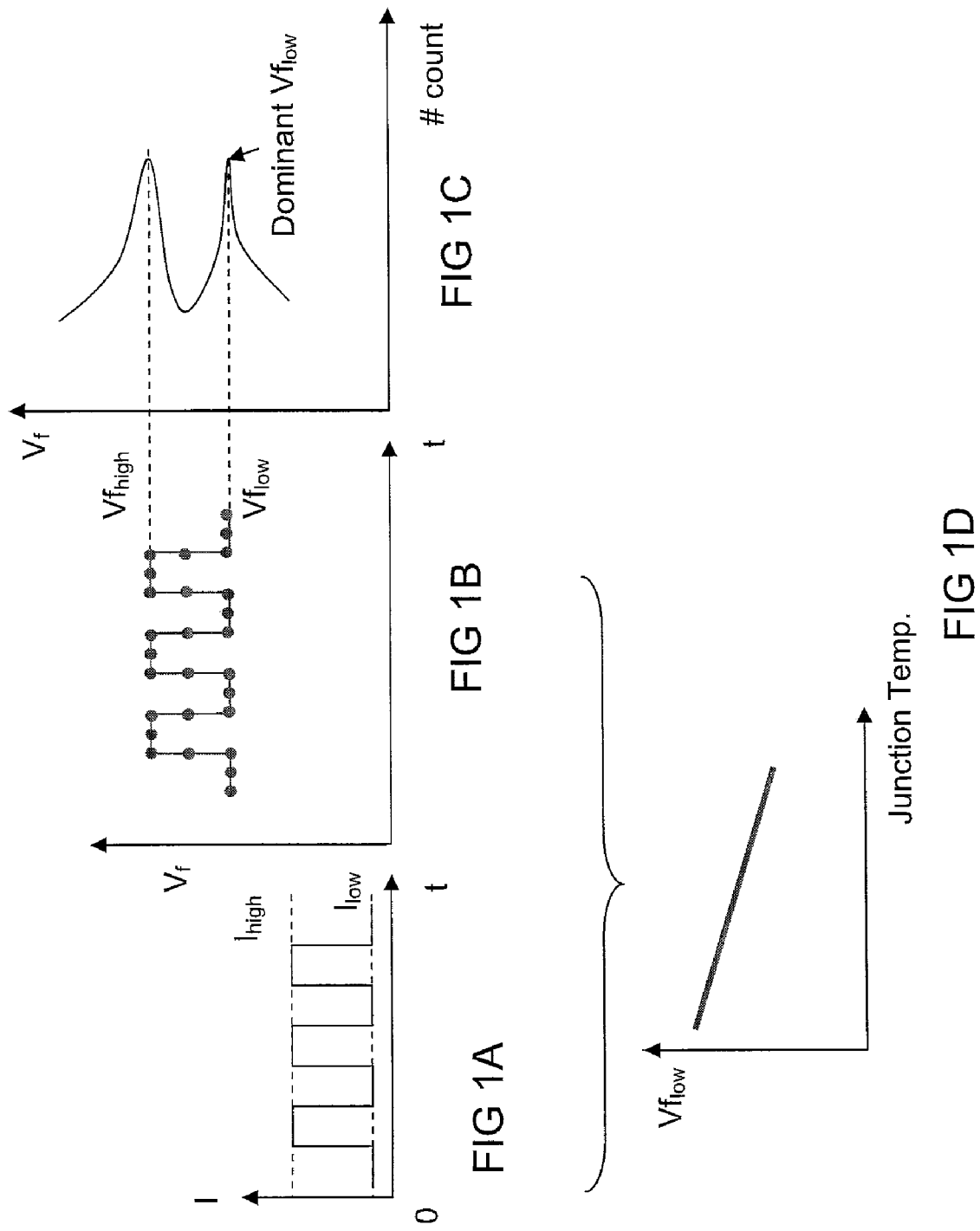
FIGS. 1A to 1D are graphs to explain the method of the invention.

FIG. 1A shows the drive current applied to the LED. A pulsed current source is used to drive the LED. The pulses drive a forward bias current through the diode, and the current is in the form of a square wave which toggles between high and low current values.

The low current value is a measuring current, preferably smaller or equal to 1 mA. More preferably this current is less then 500 µA, more preferably less then 100 µA, even more preferably less then 50 µA. The current may even be less then 10 µA, for example in the region of 5 µA.

A low measurement current (for example less than 1 mA) is desired for two main reasons. Firstly, if a LED is driven at large current, the self-heating effect starts, which means a less accurate measurement is obtained. The self-heating effect has been found by the applicant to be significant above currents of 1 mA. The self-heating effect depends on the thermal design of the LED package, and is therefore different for different LED designs.

Secondly, the larger the current, the brighter the LED. In an application such as 2D dimming TV, the minimum light level emitted from the backlight should not be more than 1% of the maximum illumination level. This 2D dimming system is a backlight control method in which only parts of the backlight are illuminated so that improved contrast between bright and dark areas of an image can be obtained.

The desire for low light output for the measurement phase means that the lowest possible current is required, but the current needs to be sufficient for the LED to be forward biased so that the voltage can be measured.

These considerations will all be taken into account when selecting the measurement current, and the value will depend on the intended use of the LED, the thermal properties of the packaging, and the LED characteristics.

FIG. 1B shows the resulting forward bias voltage drop Vf across the diode.

The forward bias voltage drop is sampled at regular intervals, and the sampling instants are shown as filled circles in the plot of FIG. 1B.

At each sampling instant, the voltage is measured, and a histogram counter monitors this LED voltage Vf, and determines the dominant value of voltage drop.

This is achieved by creating the histogram as shown in FIG. 1C. As shown, there are two peaks in the count number. The peak in the count number corresponding to the higher voltage drop derives from the drive current (as this has been shown as constant in FIG. 1A). The peak in the count number corresponding to the lower voltage drop derives from the measurement current, and this peak represents the forward bias voltage drop at the low current measurement value.

The LED junction temperature can be determined by relating the dominant forward bias voltage drop corresponding to the measurement current with a calibrated curve or an analytical model of the relationship between forward bias voltage Vf and temperature T. This relationship is shown schematically in FIG. 1D.

The LED performance is determined by the temperature at its junction.

An analytical function is used to define the relationship shown in FIG. 1D, giving very low memory requirement. This analytical function enables a very smooth control of the LED light and colour output as well as an analogue (rather than discretised) solution to the required drive current.

The output flux of the LED is controlled by the high current value of the current drive sequence, as well as the pulse frequency and the duty cycle. However, the measurement current value is unchanged throughout the operation.

At the operational current, the LED junction is heated up leading to the so-called self heating effect. Measurement using this current is therefore much less accurate (the measured temperature is always more or less than the actual temperature in this dynamic situation). An error in the temperature determination will of course have a large impact on the accuracy of the control scheme. At the operation current, especially for high power LEDs (~100 mA drive current) the contact and wiring resistance to the LED plays an important role. The variation of contact and wiring resistance can cause the forward bias voltage drop to vary typically by a few tens of mV at the operational current, which in turn gives errors to the junction temperature determination. Typically, the slope of the Vf vs. T curve is only few mV per degree Celsius.

For different currents, the slope of the Vf vs. T curve will be different. Thus, if the LED temperature is to be determined by the forward bias voltage drop at operational currents, the control will be difficult because when different output flux of the LED is required, the drive current has to be changed.

It is computationally not practical to provide an analytical model of the forward bias voltage drop both as a function of temperature and drive current.

The approach described above provides a constant measurement current so that a model of the relationship between the corresponding forward bias voltage drop and temperature can be easily derived and stored, avoiding the need for look up tables, which introduce unwanted discretisation.

Another advantage of measuring the voltage drop (and therefore temperature) at low current (for example less than 1 mA) is that in some applications, such as backlighting for an LCD panel, it enables a dimming operation to be implemented, where a fast dynamic response to a requirement for a light output change, and high contrast between light and dark, is required. The light output can be altered by changing the duty cycle of the current waveform, and the low measurement current results in very little light emission, so that good dark performance can be obtained.

The method above can be used to determine LED junction temperature for LED performance control.

Figure 2:
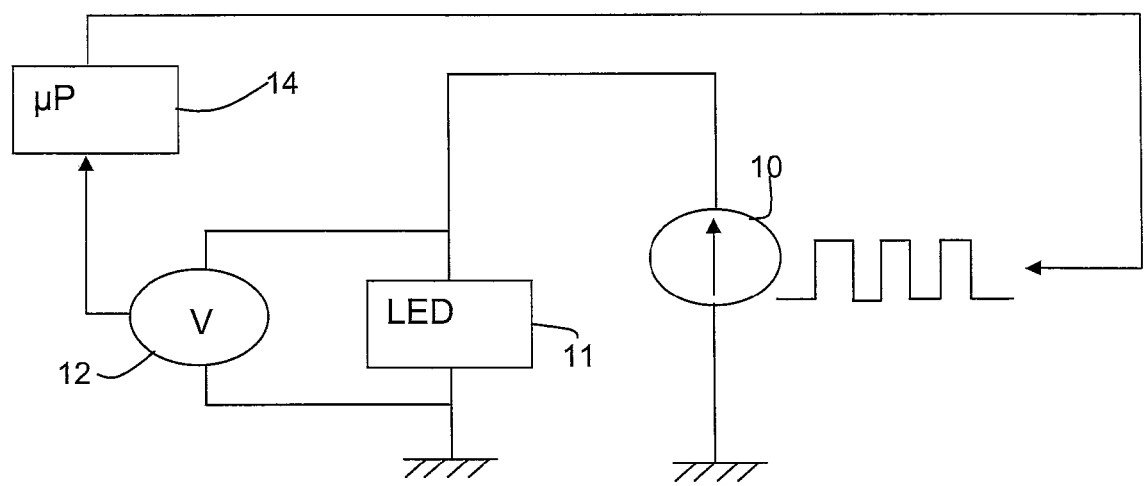
FIG. 2 shows the system which can use the driver of the invention.

FIG. 2 shows a system for estimating the junction temperature of a light emitting diode.

A current source circuit 10 is used for driving a forward bias current through the diode 11, and this current comprises the square wave described above. Examples of current source circuit in accordance with the invention are described further below.

The forward bias voltage drop is sampled by a voltage measurement circuit 12, and the samples are provided to a processor 14. The processor 14 stores the analytical function representing the voltage-temperature characteristics, and determines the forward bias voltage drop at the measurement current based on the histogram analysis described above. The processor derives the temperature from the determined forward bias voltage drop using the function.

The temperature is then used for controlling the diode 11 so that the light output is accurately controlled to a desired level with the effects of temperature being compensated.

As mentioned above, the luminous flux of a LED can essentially be controlled in two ways (or a combination of these):

(i) the amplitude of a constant current,
(ii) a pulsed current (between a constant operation current and zero) and variable duty cycle.

In general, a LED is driven by the second method for a number of reasons. This drive method gives no chance for thermal runaway issues. As a result of a constant operational current, the dependency of the LED peak wavelength on the current is eliminated, and thus controlling the LED colour point is easier.

FIG. 2 shows the current source 10 under the control of the processor 14, so that a control loop is implemented.

For a given colour point and desired luminous flux, the task of the control loop model is to calculate the appropriate currents for red, green and blue LEDs based on the junction temperature information from the LEDs.

The control loop is based on a number of modelling steps:

The first element is the LED characterization, used to measure the LED performance as functions of temperature and drive current.

From the measured data, experimental compact models for the LEDs are built and contain the key functions of output flux $\phi$, wavelength $\lambda$ and the standard deviation $\sigma_\lambda$ of the light output intensity with respect to wavelength, centred on the wavelength which is at the peak output intensity: These three functions are all dependent on the temperature and drive current (f(Tj, I)).

The models of the red green and blue LEDs are then incorporated into a program to calculate the colour point coordinate u'v', and into a program to calculate total luminous flux output of the LED cluster at a given temperature and drive currents.

For a certain required colour point and luminous flux, and at a specific junction temperature, a set of currents for the red, green and blue LEDs can then be calculated. This calculation is then repeated for other temperatures within the possible operating temperature range of the LED cluster.

This modelling enables a table containing junction temperature values and corresponding currents for red, green and blue LEDs to be built. Finally, the table is reduced into three analytical functions which describe the relation between the drive current of a LED and junction temperature, so that the combination of three red, green and blue LEDs produces the exact colour point and luminous flux requested.

For practical reasons, the analytical functions can be parabolic functions. Thus for each LED cluster, there are only 3 parameters needed for the control model at a given colour point and luminous flux. By using analytical functions instead of a table look-up method, the control quality is greatly improved and much less memory space is required to store the control model in a LED driver chip.

For lighting purposes, the current frequency has to be high enough so that human eye can not see the flickering. This minimum frequency is around 24 Hz, but in practice the pulsing frequency will typically be between 300 Hz and 1.5 kHz, but it can be even higher. For TV backlight applications, the most common frame rate now is 120 Hz. and this sets the minimum frequency for the LED pulsing.

The invention provides a dual LED driver arrangement, in which two separate current source drivers are provided in parallel. A main current source is provided to deliver the required power to the LEDs with PWM (and amplitude) control. A parallel current source (which may be a linear current source) delivers the small Vf sensing current for the LEDs with on/off (and amplitude) control.

Figure 3:
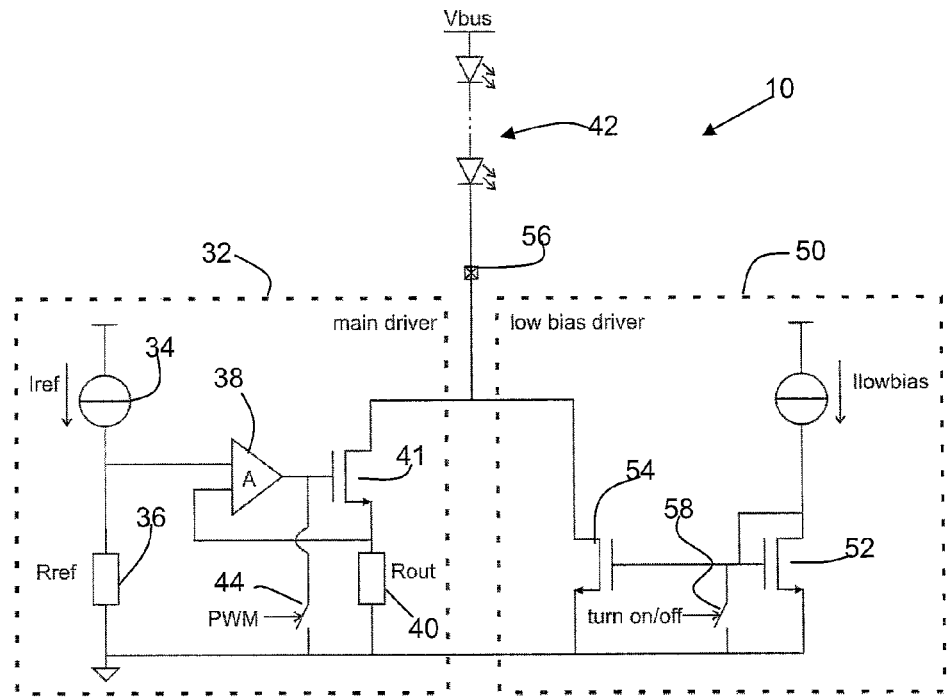
FIG. 3 shows a first example of driver circuit of the invention.

FIG. 3 shows a first embodiment of the invention, which uses linear LED drivers. Linear LED drivers are typically used for 10 mA to 100 mA low-to-medium power LEDs in for example LCD backlighting applications: television, monitor, notebook, portable devices.

The driver arrangement 10 comprises a main linear driver 32, which comprises a reference current source 34 (Iref) which drives a current through a reference resistor 36 (Rref). This generates a reference voltage, which is connected to the input of a high input impedance amplifier 38. The LED current is drawn through an output resistor 40 (Rout), and the amplifier ensures that the voltage across the reference resistor 36 is equal to the voltage across the output resistor 40. The amplifier 38 drives an output transistor 41 which drives/draws current through the LED (or LED chain) 42. In this way, the driver functions as a current mirror, but scaling can be implemented based on the ratio of the resistances of the reference and output resistors.

In particular, the output current of the main driver is determined from Iref×Rref/Rout. The output can be made amplitude-programmable by means of different Iref settings, or different Rref values or both. In principle, it is also possible to make the amplitude programmable by means of different Rout values. The main driver 32 has a switch 44 which allows pulse width modulation control of the current.

The main linear LED driver 32 is augmented with a dedicated switchable parallel driver 50 which is optimized for low bias currents.

The low bias driver 50 is implemented as a transistor current mirror circuit, having a pair of transistors 52,54 with the same gate and source connections. One 52 is supplied with a reference current (Ilowbias) and this is mirrored by the other 54, which is used to drive the LED 42.

The output current of the low bias driver 50 is added to the main driver output on the same pin 56. The low bias current can be turned on or off by means of an on/off switch 58 which shorts the gate and source of the transistors to turn them off. The amplitude of the low bias current can be made programmable by means of different Ilowbias settings.

Figure 4:
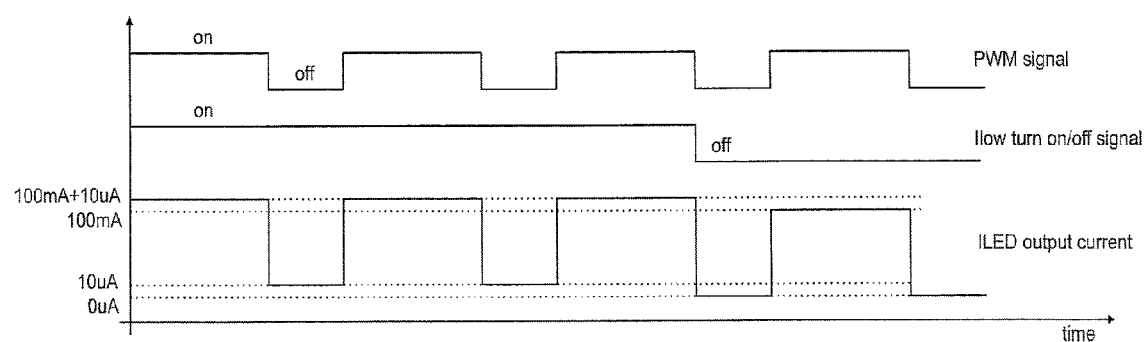
FIG. 4 shows a timing diagram for the circuit of FIG. 3.

The resulting current waveform is as shown in FIG. 4 with an example 100 mA main LED current and 10 uA Vf sensing current. FIG. 4 also shows that keeping the 10 uA low bias current of driver 50 on during PWM dimming of the main driver 32, gives practically no negative effect to the accuracy of the main driver. The main driver design tolerances are typically 1%, i.e. 1 mA tolerance on the 100 mA driver current. This 1 mA is in this case two orders of magnitudes higher than the 10 uA measurement current. #

This means the low bias driver can be simply be turned on when the voltage measurements are to be made, with no synchronization between the two drivers being required. This leads to a simple design for driver 50. FIG. 4 shows the low bias driver switching between on and off by means of the "Ilow turn on/off signal". The effect of this on the ILED output current can be seen, as a drop of 10 uA. Instead, the first drive circuit may be switched off for the high current periods, by timing the control of the first drive circuit in complementary manner, with the same timing as the PWM signal.

At higher currents such as 350 mA to 2 A and/or higher voltages, a switch-mode driver is typically employed.

Figure 5:
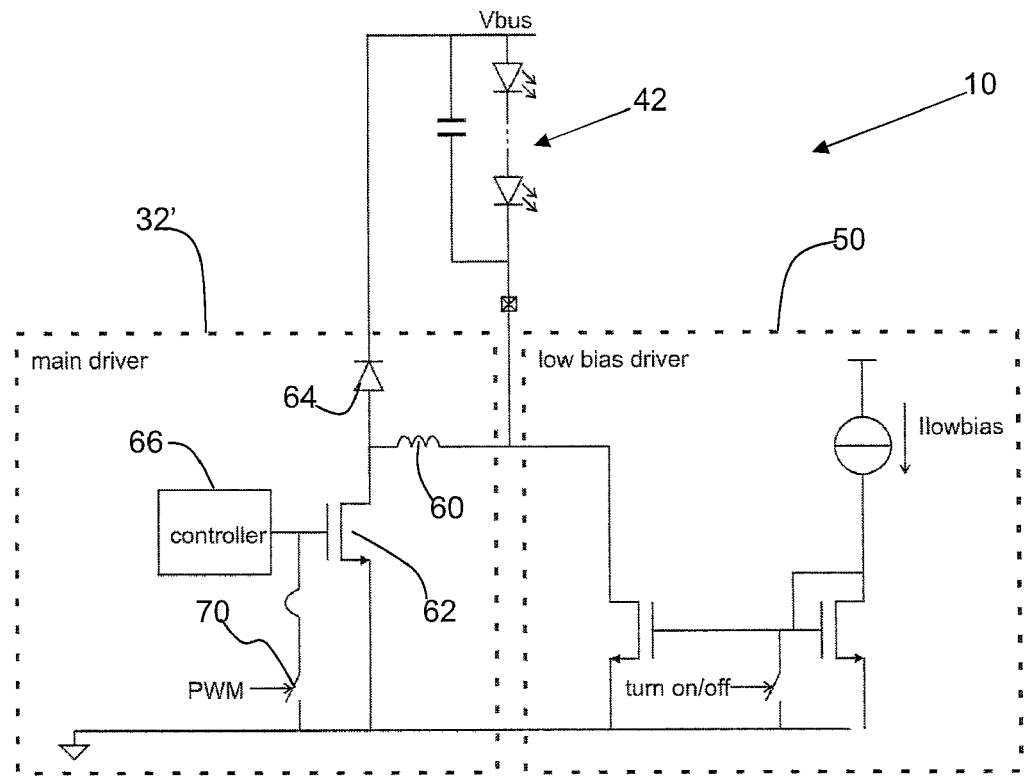
FIG. 5 shows a second example of driver circuit of the invention.

An example is shown in FIG. 5.

The main driver 32' comprises a switch mode buck converter. This type of driver functions as a step down DC to DC converter. The converter comprises an inductor 60 and a transistor 62 and diode 64 for controlling the inductor. With the transistor 62 turned on, current is drawn through the LED and the inductor by the transistor 62. With the transistor 62 turned off, the inductor supplies energy to the LED 42 through the diode 64.

The duty cycle of the transistor 62, as determined by the controller 66, is used to control the voltage supplied across the LED 42. The output voltage—i.e. voltage across the LEDs—is lower than the input voltage Vbus.

Pulse width modulation is implemented by turning on and off the switch-mode converter by means of the switch 70.

The pulse width modulation has a much lower frequency than the frequency of the duty cycle control The duty cycle control has conversion frequencies typically in range of 100 kHz to 2 MHz, while the PWM frequencies are typically in range 100 Hz to 2 kHz.

The low bias driver 50 is the same as shown in FIG. 3, and keeps the LEDs biased at a low bias current such that the LED string forward voltage can be measured to yield accurate LED junction temperature information.

Figure 6:
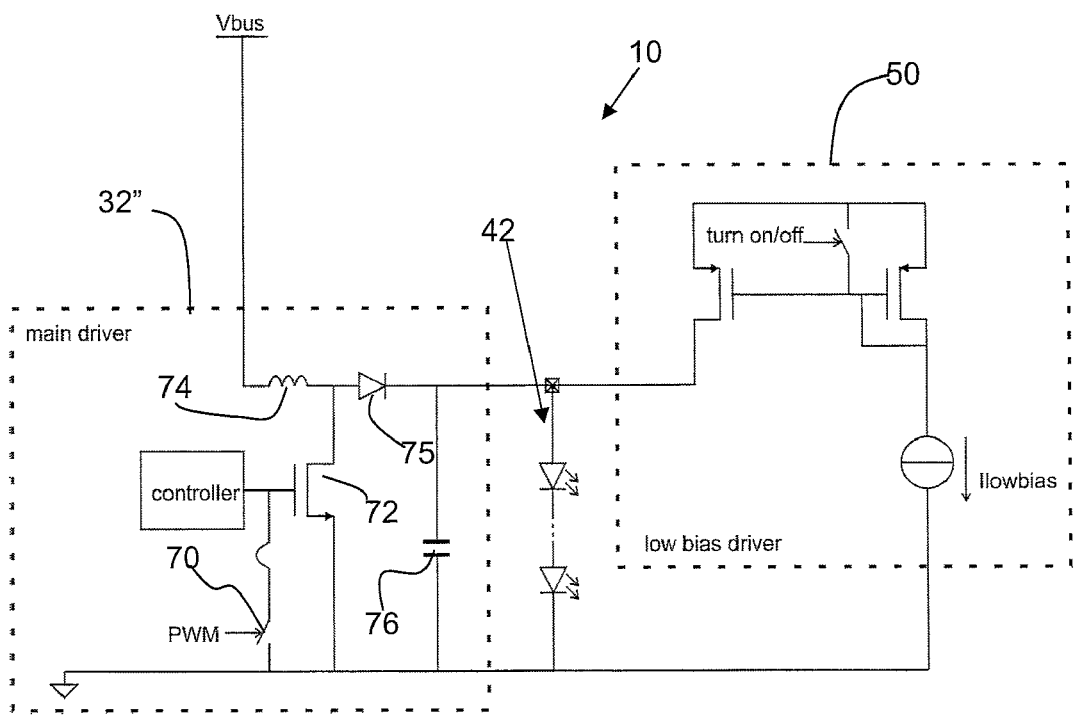
FIG. 6 shows a third example of driver circuit of the invention.

FIG. 6 shows an example in which the main driver 32" is implemented as a switch-mode boost converter. The transistor 72 is used to increase the inductor current (inductor 74) when turned on, and when turned off, the inductor current flows through diode 75 to the parallel circuit of capacitor 76 and the LED load 42. The output again depends on the duty cycle of the transistor 72, and the circuit provides a step-up voltage function, i.e. the voltage across the LEDs is larger than the input voltage Vbus.

As for the circuit of FIG. 5, pulse width modulation is implemented by turning on and off the switch-mode converter by means of the switch 70.

The low bias driver 50 in FIG. 6 is shown with a high-side current mirror that sources current into LED 42. This has the advantage that the output pin of main driver 32 can be shared with the output pin of driver 50. Also a low-side current mirror implementation is possible that sinks currents, as in FIG. 3.

The forward bias voltage can be measured using an Analog-to-Digital Converter that samples the voltage over the LED, while the low current is flowing through the LED. The optimal location for this measurement ADC is inside the LED driver in order to reduce cost, but of course this measurement ADC may as well be implemented outside the driver. An advantage of the dual driver topology described above in the case of a switch-mode main LED driver is that no power switching (and associated losses) is present during the voltage sensing. The main LED driver can be turned off completely.

All the functionality (excluding the LEDs, coil and capacitor) of FIGS. 3, 5 and 6 can be integrated in an IC. The same pin from the main driver current source output can be used for the low bias current output. Extra pins can be provided to have direct access to the LED string for the low bias current output.

A small number of examples of possible main driver circuit have been given, but any known high current drive circuit can be used. Similarly, any suitable low current drive circuit can be used for the additional driver circuit. The invention simply requires that the operation of each circuit can be interrupted so that the overall circuit output can toggle between current values generated by the two different circuit.

Various modifications will be apparent to those skilled in the art.

The invention claimed is:

1. A driver circuit for a light emitting diode, comprising:
a first driver circuit for generating a first current output ($I_{high}$) for driving the light emitting diode, wherein the first driver circuit has a control switch for interrupting the supply of the first current output;
a second driver circuit for generating a second current output ($t_{low}$) for driving the light emitting diode, wherein the second driver circuit has a control switch for interrupting the supply of the second current output,
wherein the output of the driver circuit comprises the combination of the first and second driver circuit outputs, in the form of a pulse width modulated output current which alternates between a high current including the first current output ($I_{high}$) generated by the first driver circuit and a low current comprising the second current output ($I_{low}$) generated by the second driver circuit;
wherein the high current value ($I_{high}$) comprises an LED operation current, and the low current value ($I_{low}$) comprises a non-zero measurement current; and wherein the first current output is operated with a frequency of the pulse width modulated output, and the second current output is on for the duration of a measurement cycle.

2. A circuit as claimed in claim 1, wherein the low current value ($I_{low}$) is less than or equal to 1 mA.

3. A circuit as claimed in claim 1, wherein the low current value ($I_{low}$) is less than or equal to 0.1 mA.

4. A circuit as claimed in claim 1, wherein the high current value ($I_{high}$) is greater than or equal to 10 mA.

5. A circuit as claimed in claim 1, wherein the high current value ($I_{high}$) is greater than or equal to 100 mA.

6. A circuit as claimed in claim 1, wherein the first driver circuit comprises a linear driver circuit.

7. A circuit as claimed in claim 1, wherein the first driver circuit comprises a switch mode power converter.

8. A circuit as claimed in claim 1, wherein the second driver circuit comprises a linear driver circuit.

9. A system for estimating the junction temperature of a light emitting diode, comprising:
   a circuit as claimed in claim 1, for driving a forward bias current through the diode,
   means for sampling the forward bias voltage drop (Vf), and determining the forward bias voltage drop ($Vf_{low}$) at the low current value, which comprises a measurement current; and
   means for deriving the temperature from the determined forward bias voltage drop.

10. A system as claimed in claim 9, wherein the means for sampling comprises means for analysing the samples to find a forward bias voltage drop which corresponds to a peak in the number of occurrences of that voltage drop.

11. A LED control system comprising:
   a system for estimating the junction temperature as claimed in claim 9; and
   an LED drive circuit for driving the LED in dependence on the estimated junction temperature.

12. A method of estimating the junction temperature of a light emitting diode, comprising:
   generating a forward bias current using a circuit as claimed in claim 1, and driving the output current through the diode;
   sampling the forward bias voltage drop (Vf), and determining the forward bias voltage drop ($Vf_{low}$) at the low current value, which comprises a measurement current ($I_{low}$); and
   deriving the temperature from the determined forward bias voltage drop.

13. A method as claimed in claim 12, wherein determining the forward bias voltage drop (Vf) comprises analysing the samples to find a forward bias voltage drop which corresponds to a peak in the number of occurrences of that voltage drop.

14. A system for estimating the junction temperature of a light emitting diode, the system comprising:
   a circuit for driving a forward bias current through the diode, the circuit comprising;
   a first driver circuit for generating a first current output ($I_{high}$) for driving the light emitting diode, wherein the first driver circuit has a control switch for interrupting the supply of the first current output; and
   a second driver circuit for generating a second current output ($I_{low}$) for driving the light emitting diode, wherein the second driver circuit has a control switch for interrupting the supply of the second current output;
   wherein the output of the driver circuit comprises the combination of the first and second driver circuit outputs, in the form of a pulse width modulated output current which alternates between a high current including the first current output ($I_{high}$) generated by the first driver circuit and a low current comprising the second current output ($I_{low}$) generated by the second driver circuit;
   means for sampling the forward bias voltage drop (Vf), and determining the forward bias voltage drop ($Vf_{low}$) at the low current value, which comprises a measurement current; and
   means for deriving the temperature from the determined forward bias voltage drop.

15. A system as claimed in claim 14, wherein the means for sampling comprises means for analysing the samples to find a forward bias voltage drop which corresponds to a peak in the number of occurrences of that voltage drop.

16. A LED control system comprising:
   a system for estimating the junction temperature as claimed in claim 14; and
   an LED drive circuit for driving the LED in dependence on the estimated junction temperature.

17. A method of estimating the junction temperature of a light emitting diode, the method comprising:
   generating a forward bias current using a circuit, and driving the output current through the diode, wherein the circuit comprises;
   a first driver circuit for generating a first current output ($I_{high}$) for driving the light emitting diode, wherein the first driver circuit has a control switch for interrupting the supply of the first current output; and
   a second driver circuit for generating a second current output ($I_{low}$) for driving the light emitting diode, wherein the second driver circuit has a control switch for interrupting the supply of the second current output;
   wherein the output of the driver circuit comprises the combination of the first and second driver circuit outputs, in the form of a pulse width modulated output current which alternates between a high current including the first current output ($I_{high}$) generated by the first driver circuit and a low current comprising the second current output ($I_{low}$) generated by the second driver circuit;
   sampling the forward bias voltage drop (Vf), and determining the forward bias voltage drop ($Vf_{low}$) at the low current value, which comprises a measurement current ($I_{low}$) and
   deriving the temperature from the determined forward bias voltage drop.

18. A method as claimed in claim 17, wherein determining the forward bias voltage drop (Vf) comprises analysing the samples to find a forward bias voltage drop which corresponds to a peak in the number of occurrences of that voltage drop.

* * * * *